United States Patent [19]

Klosterhaus

[11] Patent Number: 5,002,142
[45] Date of Patent: Mar. 26, 1991

[54] VEHICLE STEERING SYSTEM

[75] Inventor: Edwin G. Klosterhaus, Livonia, Mich.

[73] Assignee: TRW Inc., Lyndhurst, Ohio

[21] Appl. No.: 337,894

[22] Filed: Apr. 14, 1989

[51] Int. Cl.⁵ .............................................. B62D 5/04
[52] U.S. Cl. .................................. 180/79.1; 180/140; 180/148; 74/422
[58] Field of Search ................ 280/91, 95.1; 180/79.1, 180/148, 147, 234, 242, 140, 152, 153, 155, 156; 74/388 PS, 422

[56] References Cited

U.S. PATENT DOCUMENTS

| | | | |
|---|---|---|---|
| 3,157,061 | 11/1964 | Parker | 74/422 |
| 3,532,178 | 10/1970 | Lindbom | 280/91 |
| 4,144,948 | 3/1979 | Sergay | 180/148 |
| 4,215,591 | 8/1980 | Bishop | 74/422 |
| 4,367,803 | 1/1983 | Wittren | 180/153 |
| 4,593,781 | 6/1986 | Galtier | 180/79.1 |
| 4,714,262 | 12/1987 | Wood | 280/95.1 |
| 4,741,409 | 5/1988 | Westercamp et al. | 180/79.1 |
| 4,828,063 | 5/1989 | Ogura et al. | 74/422 |

FOREIGN PATENT DOCUMENTS 0040929  4/1978  Japan .................................. 180/140

*Primary Examiner*—Charles A. Marmor
*Assistant Examiner*—A. M. Boehler
*Attorney, Agent, or Firm*—Tarolli, Sundheim & Covell

[57] ABSTRACT

An apparatus for steering a steerable wheel of a vehicle having a frame member. The apparatus comprises a housing pivotally connectable with the frame member of the vehicle. A rack member is connectable with the steerable wheel of the vehicle and has rack teeth formed thereon. The rack member is axially movable relative to the housing. A rotatable pinion gear is in meshing engagement with the rack teeth on the rack member. The rack member is axially movable relative to the housing to turn the steerable wheel of the vehicle in response to rotation of the pinion gear. The pinion gear is rotatably driven by an electric motor to axially move the rack member relative to the housing.

12 Claims, 3 Drawing Sheets

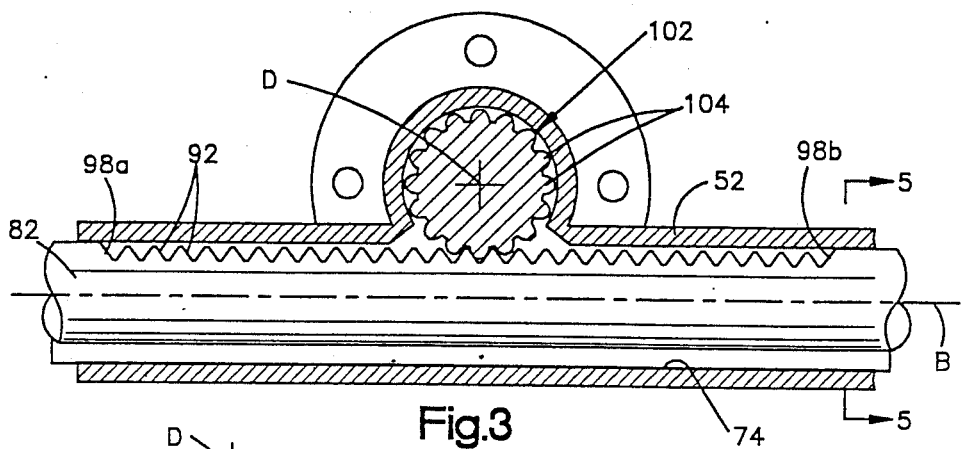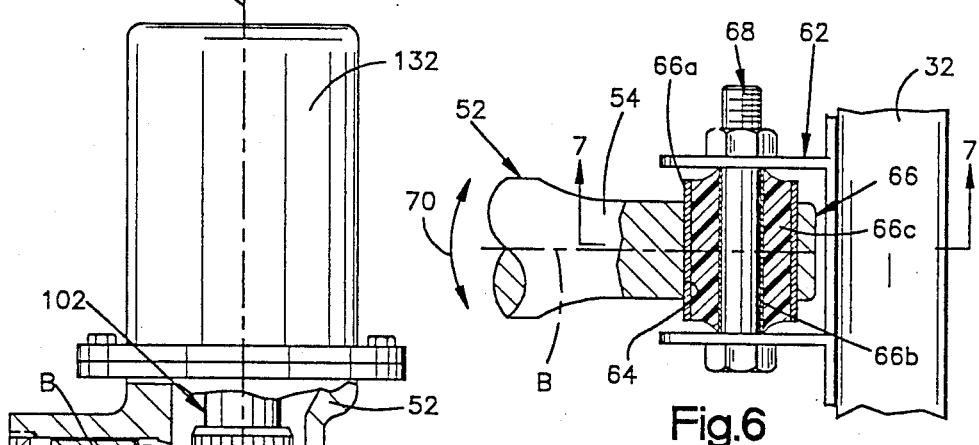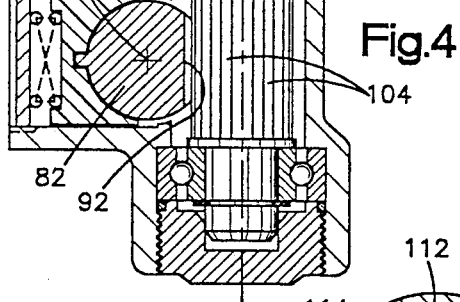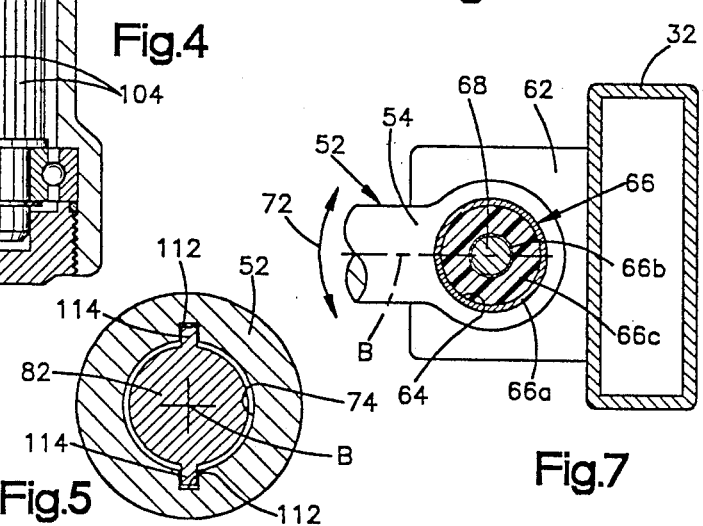

VEHICLE STEERING SYSTEM

BACKGROUND OF THE INVENTION

1. Field of the Invention

The present invention relates to a steering system for a vehicle. Particularly, the present invention relates to a steering system in which each steerable wheel has a respective electric motor associated with it to effect turning of the steerable wheel independently of turning of any other steerable wheel.

2. Description of the Prior Art

Vehicle steering systems in which each steerable wheel of a vehicle has a respective electric motor associated with it to effect turning of the steerable wheel independently of any other steerable wheel are known. One such steering system is disclosed in U.S. Pat. No. 4,741,409. The steering system disclosed in U.S. Pat. No. 4,741,409 includes a steering gear having a housing which is connectable with the vehicle. First and second rack members are supported for axial movement by the housing and for telescoping movement relative to one another. Each rack member is connected through a pivot joint of a respective tie rod with an associated steerable wheel. A pair of rotatable pinion gears are also supported by the housing. Each pinion gear meshingly engages with a respective one of the rack members. Each pinion gear is connected with a respective one of a pair of electric motors. Energization of one of the electric motors causes rotation of the associated pinion gear which, in turn, moves the associated rack member axially to steer the steerable wheel independently of the other vehicle wheel. The rack members mechanically interconnect when a relative travel limit is reached to block relative telescoping movement between the rack members in the event of a failure of one of the electric motors.

Such a steering gear has the disadvantage of being relatively large and thus occupying a relatively large amount of space within the vehicle. It will be apparent that it is desirable to decrease the size of the steering gear to increase the amount of available space within the vehicle especially when the steering gear is mounted in the engine compartment of the vehicle.

SUMMARY OF THE INVENTION

The present invention is directed to a steering system for a vehicle. The steering of each steerable wheel of the vehicle is controlled by a respective steering gear associated with the steerable wheel. Thus, each steerable wheel may be steered independently of any other steerable wheel.

Each steering gear comprises a housing which is pivotably connectable with a frame member of the vehicle. A rack member is connectable with one of the steerable wheels and has rack teeth formed thereon. The rack member is supported by and axially movable relative to the housing. A rotatable pinion gear is in meshing engagement with the rack teeth on the rack member. An axial end portion of the rack member is pivotally connectable with the steerable wheel of the vehicle. The rack member moves axially relative to the housing to turn the associated steerable wheel of the vehicle in response to rotation of the pinion gear. Actuatable drive means rotates the pinion gear in response to rotation of a steering input shaft which is connected to a steering handwheel of the vehicle. The actuatable drive means comprises an electric motor connected with the pinion gear.

Preferably, the pair of steering gears of the steering system are spaced from one another and each of the steering gears is located entirely on a respective side of the centerline of the vehicle. This enables the size of the steering gears to be relatively compact. The size of the steering gears, spacing of the steering gears in the vehicle and the novel mounting of the steering gears increases the available space within the vehicle. This is especially advantageous when the steering system is used to steer the front wheels of a vehicle so increased underhood space is available for the vehicle power train and accessories.

BRIEF DESCRIPTION OF THE DRAWINGS

Further features of the present invention will become apparent to those skilled in the art to which the present invention relates from reading the following specification with reference to the accompanying drawings, in which:

FIG. 3 is an enlarged cross sectional view of a portion of the steering gear of FIG. 2, taken approximately along line 3—3 in FIG. 2;

FIG. 4 is a cross sectional view of another portion of the steering gear of FIG. 2, taken approximately along line 4—4 in FIG. 2;

FIG. 5 is an enlarged cross sectional view of a portion of the housing and rack member of FIG. 3, taken approximately along the line 5—5 in FIG. 3;

FIG. 6 is an enlarged cross sectional view of a pivotal connection for the steering gear of FIG. 2;

FIG. 7 is a cross sectional view of the pivotal connection of FIG. 6, taken approximately along line 7—7 in FIG. 6.

DESCRIPTION OF A PREFERRED EMBODIMENT

Figure 1:
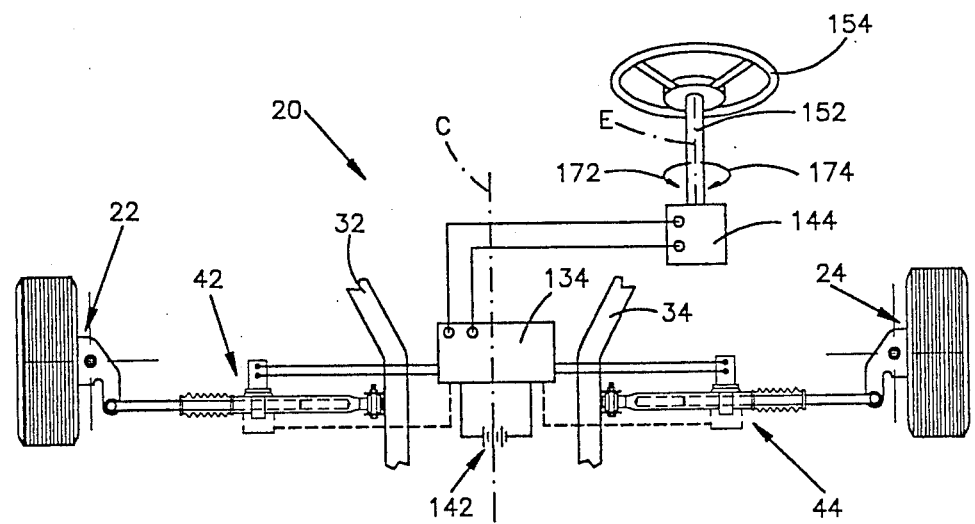
FIG. 1 is a schematic illustration of a vehicle steering system embodying the present invention.

A steering system 20 for steering a pair of front steerable wheels 22, 24 of a vehicle is illustrated in FIG. 1. It will be apparent that the steering system may also be used to steer rear steerable wheels of the vehicle. The vehicle includes a pair of frame members 32, 34. Each one of a pair of steering gears 42, 44 is connected between a respective frame member 32, 34 and a respective one of the steerable wheels 22, 24. Each one of the steering gears 42, 44 is located entirely on a respective side of the centerline C of the vehicle.

The left steering gear 42, as viewed in FIG. 1, is similar in construction to the right steering gear 44. Thus, a description of the structure of the left steering gear 42 (FIG. 2) applies to the right steering gear 44 as well. Therefore, only the left steering gear 42 is described in detail below.

Figure 2:
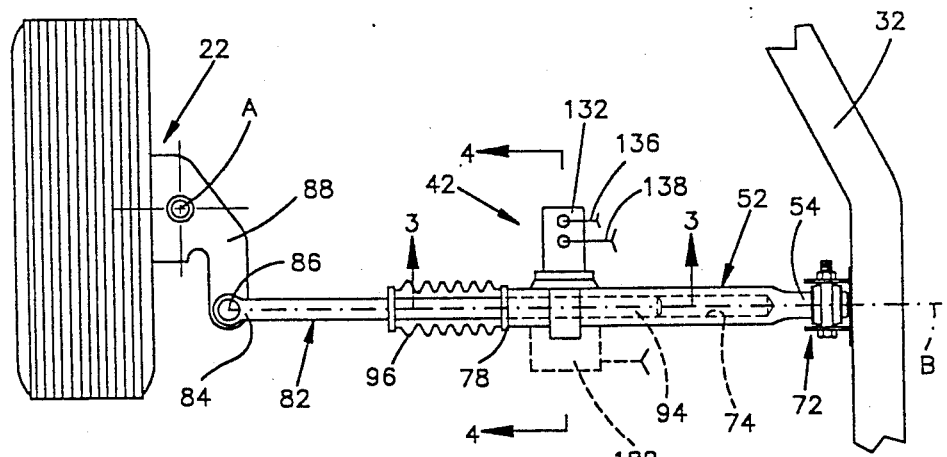
FIG. 2 is a view of a steering gear of the steering system of FIG. 1.

The steering gear 42 includes an elongate metal housing 52 (FIG. 2). An axial end portion 54 of the housing 52 is pivotably connected to the vehicle frame 32. A bracket 62 (FIG. 6) is fixed to the frame member 32. An opening 64 extends through the axial end portion 54 of the housing 52 in a direction perpendicular to the longitudinal central axis B of the housing 52. A bushing 66 is received in the opening 64 in the housing. The bushing 66 includes an outer metal sleeve 66a and an inner metal sleeve 66b. An elastomeric member 66c is bonded between the outer and inner metal sleeves 66a, 66b. A fastener 68 extends through openings in the bracket 62 and through the inner sleeve 66b to attach the housing 52 to the frame member 32. The resilient elastomeric bushing member 66c permits pivotal movement of the housing 52 relative to the frame member 32 in a horizontal plane as indicated by the arrows 70 (FIG. 6). The bushing 66 also permits pivotal movement of the housing 52 relative to the frame member 32 in a vertical plane as indicated by arrows 72 (FIG. 7).

A bore 74 (FIG. 2) is formed in the housing 52 and extends coaxially for substantially the entire length of the housing. The bore 74 is closed adjacent the axial end portion 54 and is open at another axial end portion 78 of the housing 52. The steering gear 42 also includes an elongate metal rack member 82. An axial end 84 of the rack member 82 is pivotally connected by a ball and socket joint 86 to a spindle 88 of the steerable wheel 22. The spindle 88 pivots about an axis A to steer the steerable wheel 22.

Figure 8:
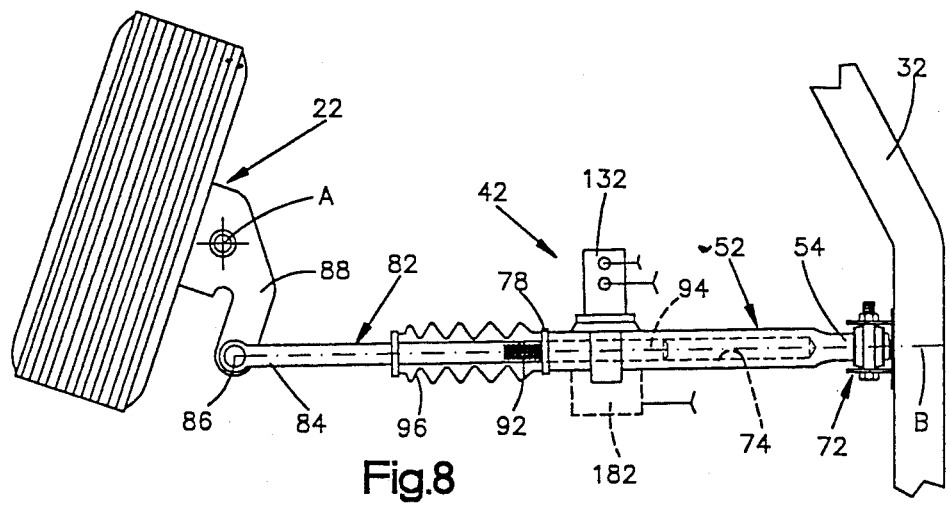
FIGS. 8 and 9 are views similar to FIG. 2 with parts in different positions.
Figure 9:
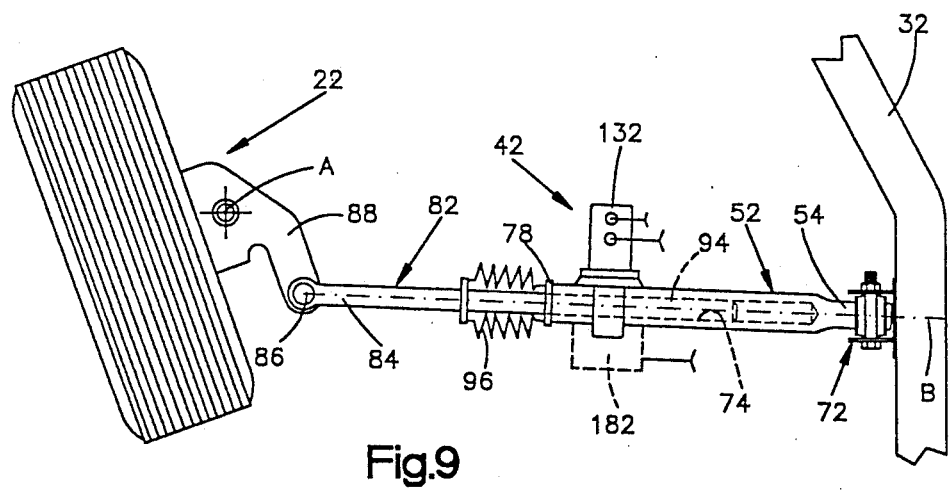

A plurality of rack teeth 92 are formed on the rack member 82. An axial end portion 94 of the rack member 82 is received within the bore 74 of the housing 52. The rack member 82 is telescopically movable relative to the housing 52 along the longitudinal central axis B of the housing. Upon telescoping movement of the rack member 82 relative to the housing 52, the spindle 88 pivots about the axis A to turn the steerable wheel 22 from the position illustrated in FIG. 2 toward either one of the positions illustrated in FIGS. 8 or 9. A bellows 96 is attached to the rack member 82 and to the axial end portion 78 of the housing 52. The bellows 96 is expandable and contractable upon movement of the rack member 82 relative to the housing 52 to prevent dirt and other contaminants from entering the housing 52 and the rack teeth 92.

A pinion gear 102 (FIGS. 3 and 4) is supported for rotation about an axis D by a portion of the housing 52. The pinion gear 102 has a plurality of gear teeth 104 in meshing engagement with the rack teeth 92 on the rack member 82. Rotation of the pinion gear 102 causes the rack member 82 to telescope relative to the housing 52. The number of rack teeth 92 and the length of the axial extent of the rack teeth determine the length of travel of the rack member 82 relative to the housing 52. The number of rack teeth 92 and the length of the axial extent of the rack teeth may vary depending on the vehicle that the steering gear 42 is used on.

The rack teeth 92 are formed intermediate axially opposite ends of the rack member 82. Surfaces 98a, 98b (FIG. 3) at axially opposite ends of the rack teeth 92 define the travel limit of the rack member 82 relative to the housing 52. For example, when the rack member 82 moves to a position so one of the surfaces 98a or 98b engages the pinion gear 102, further movement of the rack member relative to the housing 52 is blocked. This assures that the rack member 82 will not be forced out of the housing 52.

A pair of grooves 112 (FIG. 5) extend radially outwardly from the bore 74 in the housing 52 for substantially the length of the bore. A pair of projections 114 extend radially outwardly from the rack member 82. Each projection 114 is received in a respective one of the grooves 112 in the housing 52. Rotation of the rack member 82 about axis B relative to the housing 52 is blocked when the projection 114 engages a surface defining the groove 112. This assures that the rack teeth 92 always extend in a direction substantially parallel to the gear teeth 104 on the pinion gear 102 so no binding results.

An electric motor 132 (FIGS. 2 and 4) is connected directly to and extends coaxially with the pinion gear 102. Energization of the electric motor 132 causes rotation of the pinion gear 102 about the axis D. Rotation of the pinion gear 102 causes relative telescoping movement between the rack member 82 and the housing 52 to effect steering of the steerable wheel 22 of the vehicle. It will be apparent that the electric motor 132 may be connected to the pinion gear 102 through a gear reduction train if necessary. The necessity of the gear reduction train depends on the speed and power output capabilities of the electric motor 132.

The electric motor 132 is electrically connected to a controller 134 (FIG. 1) by wires 136 and 138 (FIG. 2). The controller 134 is electrically connected to a steering sensor 144 and to a power source 142 such as a battery of the vehicle. The steering sensor 144 is connected to a rotatable steering input shaft 152. The input shaft 152 is connected with a steering handwheel 154 of the vehicle.

The steering sensor 144 senses rotation of the steering input shaft 152 about its longitudinal central axis E and generates a signal indicative of the rotational position of the input shaft 152 relative to a reference position. That signal is communicated to the controller 134. The controller 134 applies electrical power to the electric motor 132 in response to receiving the signal from the steering sensor 144. The controller 134 applies electrical power to the electric motor 132 as a function determined by a control program stored in the controller which uses the information of the signal as input parameters. The controller 134 applies electric power to the appropriate electric motor 132 of either steering gear 42 or 44 to steer the vehicle. Each of the steerable wheels 22, 24 is, thus, controlled independently of the other steerable wheel by a separate electric motor 132 on a respective steering gear 42, 44.

If the steering wheel 154 and steering shaft 152 are rotated about the axis E in the direction, as indicated by the arrow 172 in FIG. 1, the electric motor 132 rotates the pinion gear 102 to drive the rack member 82 to move axially further out of the housing 52 from the position illustrated in FIG. 2. This causes the steerable wheel 22 of the vehicle to pivot toward the position illustrated in FIG. 8. If the steering wheel 154 and steering shaft 152 is rotated about the axis E, as indicated by the arrow 174 in FIG. 1, the electric motor 132 rotates the pinion gear 102 to drive the rack member 82 further into the housing 52 from the position illustrated in FIG. 2. This causes the steerable wheel 22 to pivot toward the position illustrated in FIG. 9.

The controller 134 is also connected to a linear position sensor (not shown) and an emergency locking mechanism 182 of each steering gear 42, 44, as schematically illustrated in FIG. 2. The position sensor provides feedback to the controller 134 to assure that the rack member 82 has moved the proper direction and the proper distance as determined under program control by the controller. If the controller 134 determines that the position of the rack member 82 relative to the housing 52 is not proper, the controller 134 will disconnect electrical power to the motor 132 and actuate the locking mechanism 182. The locking mechanism 182 blocks telescoping movement of the rack member 82 relative to the housing 52 to prevent uncontrolled turning of the steerable wheel 22.

It should be apparent that the dimensions of the rack teeth 92, dimensions of the rack member 82 and dimensions of the housing 52 may be varied depending on the particular vehicle application. It should also be apparent that while the steering gear 42 is illustrated as having its longitudinal central axis B extend transverse to the centerline C of the vehicle, the steering gear may be mounted in other orientations within the vehicle.

From the above description of a preferred embodiment of the invention, those skilled in the art will perceive improvements, changes and modifications therein. Such improvements, changes and modifications within the skill of the art are intended to be covered by the appended claims.

Having described a preferred embodiment of the invention, I claim:

1. An apparatus for steering first and second steerable wheels of a vehicle, the first and second steerable wheels being rotatable about a common axis when the vehicle is in a straight ahead driving condition, the vehicle having a frame, said apparatus comprising:
   a first housing pivotally connectable with the frame of the vehicle;
   a first rack member connectable with the first steerable wheel and having rack teeth formed thereon, said first rack member being axially movable within said first housing;
   a first rotatable pinion gear in meshing engagement with said rack teeth on said first rack member for axially moving said first rack member within said first housing to steer the first steerable wheel in response to rotation of said first pinion gear;
   first actuatable drive means for rotating said first pinion gear;
   a second housing pivotally connectable with the frame of the vehicle to pivot relative to said first housing;
   a second rack member connectable with the second steerable wheel and having rack teeth formed thereon, said second rack member being axially movable within said second housing;
   a second rotatable pinion gear in meshing engagement with said rack teeth on said second rack member for axially moving with second rack member within said second housing to steer the second steerable wheel in response to rotation of said second pinion gear;
   second actuatable drive means for rotating said second pinion gear; and
   control means for separately controlling actuation of said first and second drive means to steer the first and second steerable wheels independently of each other.

2. The apparatus as set forth in claim 1 wherein said first actuatable drive means comprises a first electric motor and said second actuatable drive means comprises a second electric motor.

3. The apparatus set forth in claim 1 wherein said first housing and said first rack member are adapted to be located entirely on a first side of said center line of said vehicle and said second housing and said second rack member are adapted to be located entirely on a second side of said center line of said vehicle opposite said first side.

4. The apparatus set forth in claim 1 wherein the vehicle has a center line perpendicular to the common axis of the steerable wheels, and said first housing is pivotally connectable to said frame of said vehicle to pivot about an axis parallel to said center line of said vehicle.

5. The apparatus set forth in claim 4 wherein said second housing is pivotally connectable to said frame of said vehicle to pivot about an axis parallel to said center line of said vehicle.

6. The apparatus set forth in claim 1 wherein said first and second housings are each connectable to said frame to pivot in a vertical plane.

7. The apparatus set forth in claim 1 wherein said first and second housings are pivotal between first positions wherein said first and second rack members are parallel to one another and second positions in which said first and second rack members are not parallel to one another.

8. A steering system for steering a vehicle having a frame and a pair of steerable wheels, the steerable wheels being rotatable about a common axis when the vehicle is in a straight ahead driving condition, said system comprising:
   (a) a pair of steering assemblies, each of said steering assemblies comprising:
      an elongated rack member having an axis and rack teeth;
      a housing in which said rack member is supported for axial movement;
      a rotatable pinion gear in meshing engagement with said rack teeth to move said rack member axially in said housing in response to rotation of said pinion gear; and
      actuatable drive means for rotating said pinion gear to move said rack member axially;
   (b) means for connecting each of said rack members to a different one of the pair of steerable wheels; and
   (c) means for pivotally connecting each of said housings to the frame of the vehicle for pivotal movement of each housing relative to the other.

9. The steering system set forth in claim 8 wherein said connecting means comprises means for supporting each of said housings to pivot in a vertical plane.

10. The steering system as defined in claim 8 wherein each of said actuatable drive means comprises an electric motor.

11. The steering system set forth in claim 10 wherein each of said steering assemblies further includes means for connecting the electric motor with the housing to be pivotal with the housing.

12. The steering system as defined in claim 8 wherein said connecting means comprises a pair of rigid fastening shafts, each of said shafts being associated with a different one of said housing and having a horizontal longitudinal axis defining a pivotal axis for the associated housing, said pivotal axes being perpendicular to the axis of the rack movable in the associated housing.

* * * * *

UNITED STATES PATENT AND TRADEMARK OFFICE
CERTIFICATE OF CORRECTION

PATENT NO. : 5,002,142
DATED : March 26, 1991
INVENTOR(S) : Edwin G. Klosterhaus It is certified that error appears in the above-identified patent and that said Letters Patent is hereby corrected as shown below:

Column 5, Line 46, Claim 1, delete "with" and insert --said--.

Signed and Sealed this

Sixth Day of October, 1992

Attest:

DOUGLAS B. COMER

*Attesting Officer*     *Acting Commissioner of Patents and Trademarks*